(12) United States Patent
Ding et al.

(10) Patent No.: US 12,413,520 B2
(45) Date of Patent: Sep. 9, 2025

(54) REAL-TIME PERFORMANCE OPTIMIZATION OF A PACKET NETWORK

(71) Applicant: MELLANOX TECHNOLOGIES, LTD., Yokneam (IL)

(72) Inventors: Xiaoqi Ding, Shanghai (CN); Wei Cheng, Beijing (CN); Hong Li, Shanghai (CN)

(73) Assignee: Mellanox Technologies, Ltd, Yokneam, IL (US)

( * ) Notice: Subject to any disclaimer, the term of this patent is extended or adjusted under 35 U.S.C. 154(b) by 142 days.

(21) Appl. No.: 18/310,550

(22) Filed: May 2, 2023

(65) Prior Publication Data

US 2024/0323123 A1    Sep. 26, 2024

Related U.S. Application Data

(63) Continuation of application No. PCT/CN2023/083834, filed on Mar. 24, 2023.

(51) Int. Cl.
*H04L 47/12* (2022.01)
*H04L 41/22* (2022.01)
*H04L 43/08* (2022.01)

(52) U.S. Cl.
CPC .............. *H04L 47/12* (2013.01); *H04L 41/22* (2013.01); *H04L 43/08* (2013.01)

(58) Field of Classification Search
CPC ..... H04L 67/1097; H04L 69/22; H04L 63/08; H04L 63/126; H04L 12/4633;

(Continued)

(56) References Cited

U.S. PATENT DOCUMENTS 6,741,555 B1    5/2004    Li et al.
7,000,025 B1    2/2006    Wilson
(Continued)

FOREIGN PATENT DOCUMENTS

EP    2916521 A1    9/2015
EP    4221141 A1 *  8/2023    ............. H04L 47/12

OTHER PUBLICATIONS

Almeida et al., "Explicit rate congestion control with binary notifications", 10th IEEE Workshop on Local and Metropolitan Area Networks, pp. 1-10, Nov. 21-24, 1999.

(Continued)

*Primary Examiner* — Djenane M Bayard
(74) *Attorney, Agent, or Firm* — Meitar Patents Ltd.; Daniel Kligler

(57) ABSTRACT

A communication system (20) includes a plurality of Network Interface Controllers (NICs) (32) and one or more processors (28, 62, 64). The plurality of NICs are to connect multiple hosts to a communication network, the NICs supporting a configurable Congestion Control (CC) scheme (80) selected from among multiple CC schemes. The one or more processors are coupled to the communication network, and are to receive performance indicators indicative of congestion states occurring in the communication network due to communication of the hosts with one another over the communication network, the performance indicators being associated with respective times of occurrence, select respective CC schemes for one or more of the NICs based on the performance indicators and corresponding times of occurrence, and provision the selected CC schemes in the one or more of the NICs.

21 Claims, 6 Drawing Sheets

(58) Field of Classification Search
CPC ..... H04L 45/74; H04L 45/745; H04L 63/029; H04L 63/1433; H04L 63/145; H04L 67/1078; H04L 43/08; H04L 41/12; H04L 41/0813; H04L 41/0823; H04L 41/0869; H04L 41/50; H04L 41/509; H04L 43/04; H04L 43/10; H04L 65/60; H04L 67/10; H04L 67/55; H04L 41/0816; H04L 41/0893; H04L 41/5041; H04L 47/70; H04L 47/83; H04L 61/10; H04L 61/2503; H04L 61/4511; H04L 61/4535; H04L 61/58; H04L 65/403; H04L 67/01; H04L 67/06; H04L 67/1076; H04L 67/1095; H04L 67/2885; H04L 67/289; H04L 67/51; H04L 67/568; H04L 47/12; H04L 47/11; H04L 47/10; H04L 47/125; H04L 47/32; H04L 41/0895; H04L 45/22; H04L 45/38; H04L 47/2483; H04L 41/0894; H04L 47/2441; H04L 47/263; H04L 43/20; H04L 47/24; H04L 47/27; H04L 43/16; H04L 43/0876; H04L 43/12; H04L 47/122; H04L 47/193; H04L 45/66; H04L 47/20; H04L 47/822; H04L 67/61; H04L 41/40; H04L 43/0882; H04L 47/30; H04L 49/90; H04L 41/0806; H04L 43/0829; H04L 47/803; H04L 41/0896; H04L 43/0852; H04L 45/24
See application file for complete search history.

(56) References Cited

U.S. PATENT DOCUMENTS

| | | | |
|---|---|---|---|
| 7,035,220 | B1 | 4/2006 | Simcoe |
| 9,497,125 | B2 | 11/2016 | Raindel et al. |
| 9,985,910 | B2 | 5/2018 | Gafni et al. |
| 10,084,716 | B2 | 9/2018 | Gafni |
| 11,218,413 | B2 | 1/2022 | Shpigelman et al. |
| 11,296,988 | B2 | 4/2022 | Shpigelman et al. |
| 2007/0070901 | A1 | 3/2007 | Aloni et al. |
| 2007/0248013 | A1 | 10/2007 | Sridharan et al. |
| 2009/0282291 | A1 | 11/2009 | Fitzgerald et al. |
| 2014/0269301 | A1* | 9/2014 | Rungta ................. H04L 47/115 370/235 |
| 2015/0009817 | A1 | 1/2015 | Sato |
| 2015/0172193 | A1* | 6/2015 | Sinha ................... H04L 47/22 370/230 |
| 2016/0380896 | A1 | 12/2016 | Caulfield et al. |
| 2017/0093699 | A1 | 3/2017 | Crupnicoff et al. |
| 2017/0149666 | A1 | 5/2017 | Kiykioglu et al. |
| 2020/0334195 | A1 | 10/2020 | Chen et al. |
| 2023/0336490 | A1* | 10/2023 | Arslan ................. H04L 47/265 |

OTHER PUBLICATIONS

Ramakrishnan et al., "The Addition of Explicit Congestion Notification (ECN) to IP", Request for Comments: 3168, pp. 1-63, Sep. 2001.

* cited by examiner

REAL-TIME PERFORMANCE OPTIMIZATION OF A PACKET NETWORK

CROSS-REFERENCE TO RELATED APPLICATIONS

This application is a continuation of PCT Application PCT/CN2023/083834, filed Mar. 24, 2023, whose disclosure is incorporated herein by reference.

TECHNICAL FIELD

Embodiments described herein relate generally to data communication, and particularly to methods and systems for real-time performance optimization of a packet network by selecting and tuning configurable congestion control schemes.

BACKGROUND

Congestion management of packet traffic in communication systems is important for achieving high system performance. Several congestion control techniques are used in the industry, for example, a paper entitled "Explicit rate congestion control with binary notifications," by Almeida and Belo, published in the 10th IEEE Workshop on Local and Metropolitan Area Networks, Nov. 21-24, 1999, describes a rate-based source adaptation algorithm for packet-switching network, in which binary notifications are sent to the sources, reflecting a positive or negative difference between the source rate and the estimated fair rate, and based on these notifications, the sources increase or decrease the transmit rate.

Different congestion control schemes may be required depending on various factors such as the topology of the underlying network, communication protocols used, traffic patterns, and the like.

Network adapters supporting controllable congestion control are known in the art. For example, U.S. Pat. No. 11,218,413, whose disclosure is incorporated herein by reference, describes a network adapter that includes a receive (RX) pipeline, a transmit (TX) pipeline, hardware-implemented congestion-control circuitry, and a congestion-control processor. The RX pipeline is configured to receive packets from a network and process the received packets. The TX pipeline is configured to transmit packets to the network. The hardware-implemented congestion-control circuitry is configured to receive, from the TX pipeline and from the RX pipeline, Congestion-Control (CC) events derived from at least some of the packets transmitted to the network and from at least some of the packets received from the network, and to pre-process the CC events. The congestion-control processor is configured to receive the pre-processed CC events from the congestion-control circuitry, and to throttle a transmission rate of the packets transmitted to the network by the TX pipeline responsively to the pre-processed CC events.

As another example, U.S. Pat. No. 11,296,988, whose disclosure is incorporated herein by reference, describes a network adapter that includes a receive (Rx) pipeline, a transmit (Tx) pipeline and congestion management circuitry. The Rx pipeline is configured to receive packets sent over a network by a peer network adapter, and to process the received packets. The Tx pipeline is configured to transmit packets to the peer network adapter over the network. The congestion management circuitry is configured to receive, from the Tx pipeline and from the Rx pipeline, Congestion-Control (CC) events derived from at least some of the packets exchanged with the peer network adapter, to exchange user-programmable congestion control packets with the peer network adapter, and to mitigate a congestion affecting one or more of the packets responsively to the CC events and the user-programmable congestion control packets.

SUMMARY

An embodiment that is described herein provides a communication system that includes a plurality of Network Interface Controllers (NICs) and one or more processors. The NICs in the plurality of NICs are to connect multiple hosts to a communication network, the NICs supporting a configurable Congestion Control (CC) scheme selected from among multiple CC schemes. The one or more processors are coupled to the communication network, and are to receive performance indicators indicative of congestion states occurring in the communication network due to communication of the hosts with one another over the communication network, the performance indicators being associated with respective times of occurrence, select respective CC schemes for one or more of the NICs based on the performance indicators and corresponding times of occurrence, and provision the selected CC schemes in the one or more of the NICs.

In some embodiments, the one or more processors are to receive the performance indicators while the hosts communicate with one another over the communication network. In other embodiments, at least some of the multiple CC schemes are tunable via respective CC parameters, and the one or more processors are to tune the CC parameters in respective CC schemes in at least some of the NICs based on the performance indicators and on the corresponding times of occurrence. In yet other embodiments, the one or more processors are to select a common CC scheme for the one or more of the NICs.

In an embodiment, the NICs are to receive performance-related notifications from the communication network, and to generate the performance indicators based on the performance-related notifications, or to send the performance-related notifications to respective hosts for generating the performance indicators. In another embodiment, the NICs are to send the generated performance indicators over the communication network or over another network for storage in a collection of data, as a time series including multiple performance measures together with timestamps respectively assigned to the performance measures. In yet another embodiment, the one or more processors are to retrieve the time series of the performance measures from the collection of data, and to display the performance measures in the time series visually using a graphical display scheme.

In some embodiments, a user is to perform a performance optimization iteration by selecting the CC schemes and related CC parameters for the one or more of the NICs based on the time series of the performance measures graphically displayed, and controlling the one or more processors to provision the selected CC schemes and the related CC parameters to the one or more of the NICs. In other embodiments, the user is to perform multiple performance optimization iterations of adjusting the CC parameters of the selected CC schemes in the one or more of the NICs. In yet other embodiments, at least a selected processor among the one or more processors resides in a management host coupled to a management network that connects to the multiple hosts but is separate from the communication network.

In an embodiment, a given NIC among the plurality of NICs supports multiple CC schemes internally, including a given selected CC scheme, and the one or more processors are to provision the given selected CC scheme in the given NIC by indicating to the given NIC to choose the given selected CC scheme from among the multiple supported CC schemes.

There is additionally provided, in accordance with an embodiment that is described herein, a method for communication including, in a communication system that includes a plurality of Network Interface Controllers (NICs) that connect multiple hosts to a communication network, the NICs supporting a configurable Congestion Control (CC) scheme selected from among multiple Congestion Control schemes, receiving performance indicators indicative of congestion states occurring in the communication network due to communication of the hosts with one another over the communication network, the performance indicators being associated with respective times of occurrence. Respective CC schemes are selected for one or more of the NICs based on the performance indicators and corresponding times of occurrence. The selected CC schemes are provisioned in the one or more of the NICs.

These and other embodiments will be more fully understood from the following detailed description of the embodiments thereof, taken together with the drawings in which:

DETAILED DESCRIPTION OF EMBODIMENTS

Overview

Figure 1:
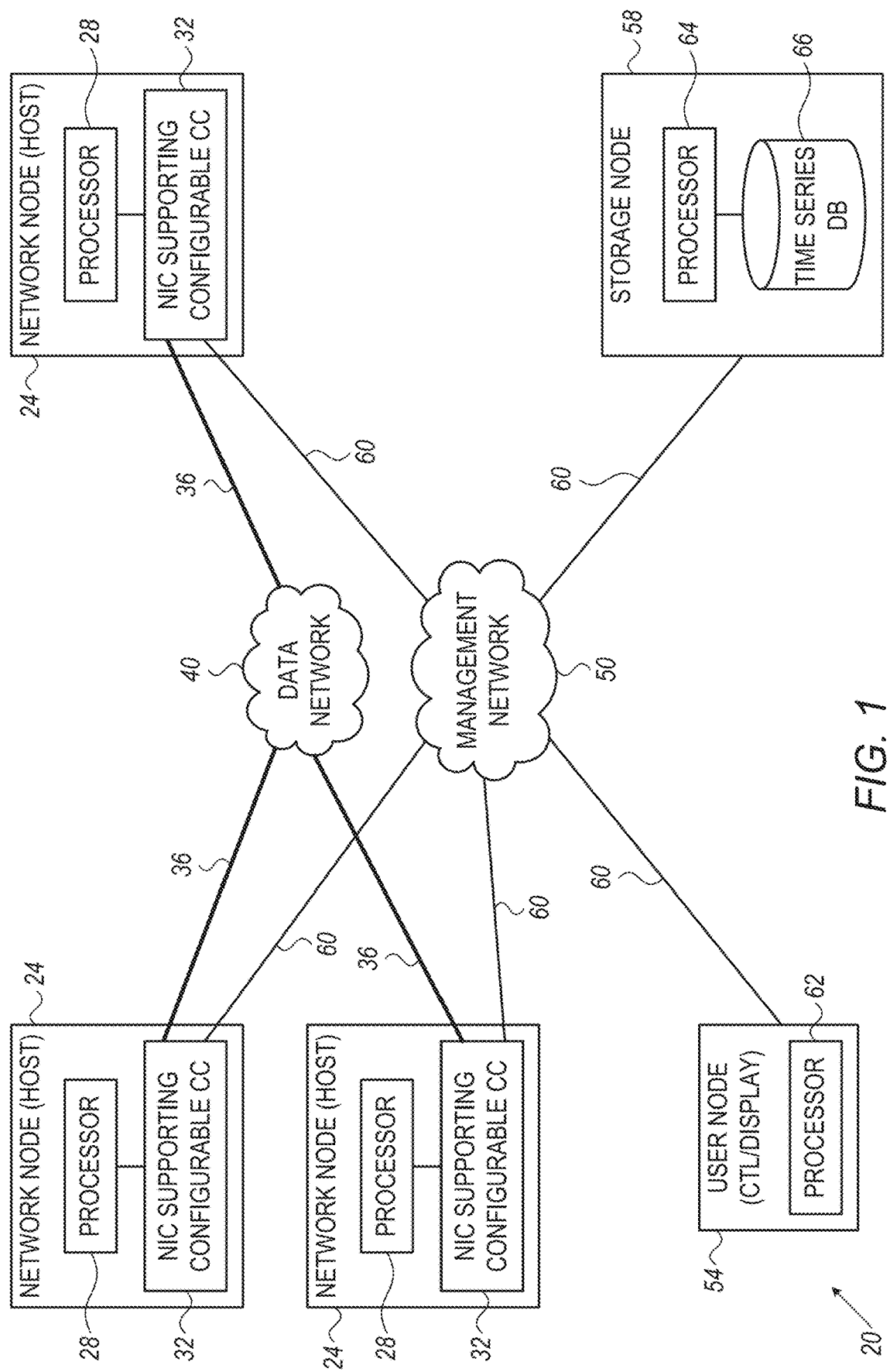
FIG. 1 is a block diagram that schematically illustrates a communication system in which congestion control schemes in network nodes are selectable and tunable in real time, in accordance with an embodiment that is described herein.

Embodiments that are described herein provide methods and systems for optimizing network performance by selecting and tuning Congestion Control (CC) schemes in network nodes. In one approach, network performance measures are displayed graphically to a user in real time, to assist the user with selecting congestion control schemes and tuning their parameters for improving the network performance.

In some types of CC schemes, a source coupled to a communication network modifies the rate of packet transmission to the network, depending on congestion notifications that the source receives from the destination. The source and destination may comprise, for example, network adapters in a source node and in a destination node, respectively. The destination receives packets sent by the source, evaluates a congestion state, and sends congestion notifications back to the source, as necessary. In applying a congestion control scheme, the source may, for example, decrease the transmission rate in response to the congestion notifications, or increase the transmission rate if no congestion notifications are received.

Remote Direct Memory Access (RDMA) is the remote memory management capability that allows server-to-server data movement directly between application memory without any CPU involvement. RDMA over Converged Ethernet (RoCE) is a mechanism to provide this efficient data transfer with very low latencies on lossless Ethernet networks. RoCE may be applied in mainstream data center applications at 10 GigE and 40 GigE link-speed. With hardware offload, a network adapter may take advantage of this efficient RDMA transport (InfiniBand) services over Ethernet to deliver ultra-low latency for performance-critical and transaction-intensive applications such as financial, database, storage, and content delivery networks.

In a typical communication system (e.g., implementing a computer system) many nodes communicate with one another over a communication network. The communication network comprises interconnected network elements such as switches and/or routers in some desired topology. Congestion may occur in the network depending on various factors such as the underlying network topology, traffic patterns, queue management in the switches, and the like. A congestion event in a network element or in the destination may occur, when a queue receiving the packets becomes over-filled, or when the queue filing rate is higher than its emptying rate. Network performance measures such as latency and throughput highly depend on the ability to prevent or decrease the rate of congestion events in the network.

Some network-based applications such as data centers employ the RoCE protocol, e.g., for improving the bandwidth of the data center. Modern data centers using the RoCE protocol (and other protocols) are, however, prone to suffer from high rates of congestion events, which may degrade the network performance considerably.

A network node typically comprises a host processor that connects to the communication network using a network adapter. Some types of network adapters comprise smart Network Interface Controllers (NICs) that offload CC from the host. Some smart NICs support a configurable CC scheme that may be selected from among multiple available CC schemes. Moreover, some CC schemes may support tunable CC parameters that affect the behavior of these CC schemes.

In general, different CC schemes and/or different CC parameters may be applied in different NICs across the network. The actual CC schemes and parameters selected for achieving high network performance may depend, among other factors, on the underlying network topology.

In principle, a network administrator could configure different combinations of CC schemes and CC parameters across the network NICs, to find a combination that achieves the highest network performance. This approach, however, is inefficient, e.g., because the number of possible different CC combinations across the network is very large, and the administrator typically has poor or no visibility to how the network performance changes with reconfiguration of the CC schemes and/or CC parameters across the network.

In the disclosed embodiments, as will be described in detail below, performance measurements are monitored and presented graphically to a user. Based on the displayed performance measurements, the user can reconfigure the CC schemes and CC parameters in NICs across the network to improve the network performance.

Consider a communication system, comprising a plurality of Network Interface Controllers (NICs) and one or more processors. The NICs are to connect multiple hosts to a communication network, the NICs supporting a configurable Congestion Control (CC) scheme selected from among multiple CC schemes. The one or more processors are coupled to the communication network, and are to receive performance indicators indicative of congestion states occurring in the communication network due to communication of the hosts with one another over the communication network, the performance indicators being associated with respective times of occurrence. The one or more processors select respective CC schemes for the NICs (or part thereof) based on the performance indicators and corresponding times of occurrence, and provision the selected CC schemes in the NICs.

In some embodiments, the one or more processors are to receive the performance indicators while the hosts communicate with one another over the communication network. In some embodiments, at least some of the multiple CC schemes are tunable via respective CC parameters, and the one or more processors tune the CC parameters in respective CC schemes in at least some of the NICs based on the performance indicators and corresponding times of occurrence. The one or more processors may select different CC schemes for different NICs or select a common CC scheme for the plurality of the NICs.

In handling congestion, the NICs receive performance-related notifications from the communication network and generate the performance indicators based on the performance-related notifications. Alternatively or additionally, the NICs send the performance-related notifications to respective hosts for generating the performance indicators.

In some embodiments, the NICs send the generated performance indicators over the communication network or over another network (e.g., a separate management network) for storage in a collection of data such as a database (DB), as a time series comprising multiple performance measures together with timestamps respectively assigned to the performance measures. The one or more processors (e.g., a processor in a control and display node) retrieve the time series of the performance measures from the collection of data, and display the performance measures in the time series visually using a graphical display scheme.

In an embodiment, a user performs a performance optimization iteration by selecting the CC schemes and related CC parameters for the NICs based on the time series of the performance measures graphically displayed. The user controls the one or more processors to provision the selected CC schemes and the related CC parameters in the NICs. The user may perform multiple performance optimization iterations of adjusting the CC parameters of the selected CC schemes in the NICs to improve the network performance.

In some embodiments, a given NIC among the plurality of NICs supports multiple CC schemes internally, including a given selected CC scheme, and wherein the one or more processors are to provision the given selected CC scheme in the given NIC by indicating to the given NIC to choose the given selected CC scheme from among the multiple supported CC schemes.

In the disclosed techniques, performance measures are derived and presented graphically to an administrator in real-time. Based on the visual information, the administrator can reselect CC schemes and/or adjust CC parameters of the CC schemes and check immediately how such reselection affects the network performance. The visualized information and the ability to modify CC schemes and CC parameters with immediate feedback allow intuitive and efficient optimization of network performance.

System Description

FIG. 1 is a block diagram that schematically illustrates a communication system 20 in which congestion control schemes in network nodes are selectable and tunable in real time, in accordance with an embodiment that is described herein.

Communication system 20 comprises multiple network nodes 24, each of which comprises a processor 28 coupled to a network interface adapter 32 such as a Network Interface Controller (NIC). The NICs in network nodes 24 connect, using any suitable links 36, to a data network 40 over which the network nodes communicate with one another. It is noted that in case of an InfiniBand network, the network adapter is typically referred to as a Host Channel Adapter (HCA).

FIG. 1 depicts three network nodes 24 for the sake of clarity. In practical applications, however, the communication system may comprise any suitable number of network nodes such as hundreds or even thousands of network nodes.

Data network 40 may comprise any suitable packet network operating using any suitable communication protocols. For example, data network 40 may comprise an Ethernet network operating using the Remote Direct Memory Access (RDMA) over Converged Ethernet (RoCE) protocol. Alternatively, an InfiniBand network can also be used.

Communication system 20 may be used in various applications such as data centers, high-performance computing systems, distributed computer systems, cluster computing, network storage applications, and the like.

The performance of data network 40, e.g., in terms of utilization, throughput and/or latency may degrade considerably due to congestion events occurring in the data network. In the present context, a congestion event may occur in a network element (e.g., a switch or a router) or in the destination node, when a local queue becomes overfilled, or when the queue's filing rate exceeds its emptying rate.

In communication system 20, a network node sending data may apply a CC scheme for adapting its transmission rate to the data network in order to avoid congestion or reduce the rate of congestion events. In describing the disclosed embodiments, it is mainly assumed that CC schemes are implemented in NICs 32. This, however, is not mandatory, and in general a CC scheme may be executed by processor 28, NIC 32, or in combination between the processor and NIC. In an embodiment, a CC scheme typically handles congestion control separately for different flows sent by the source node to respective destination nodes.

In the example of FIG. 1, NICs 32 comprise smart NICs that support configurable CC schemes. A NIC of this sort may be configured at any given time to execute a CC scheme that was recently selected for it from among multiple available CC schemes and provisioned in the NIC. Moreover, at least some of the available CC schemes comprise one or more modifiable parameters whose values affect the behavior of the CC scheme. In some embodiments, smart NICs 32 support a common group of available CC schemes. In other embodiments, different NICs across the communication network may support different groups of CC schemes.

In the example of FIG. 1, communication system 20 comprises a management network 50. In addition to network nodes 24, a user node 54 and a storage node 58 are also coupled to the management network using links 60. User node 54 uses as a user interface for control and display and is managed using a processor 62. Storage node 58 comprises a processor 64 and a time series database 66. Management network 50 may be advantageously separated from data network 40 to avoid interfering with data traffic while optimizing performance of the data network. In some embodiments, to allow real-time display and control of the data network performance, the management network is required to be faster and more reliable than the data network.

In some embodiments, data network 40 and management network 50 are physically separated, meaning that the two networks do not share network elements (switches or routers) and may use different communication protocols. In other embodiments, data network 40 and management network 50 may share some or all their network elements, in which case the data and management networks are separated logically.

As will be described below, in the process of optimizing the performance of the data network, the management network carries various management messages between the network nodes and the user node and storage node, and between the storage node and the user node.

For a given setting of CC schemes and CC parameters across the data network, the network nodes receive CC notifications from the data network, generate performance indicators based on the CC notifications, and send the performance indicators to the storage node over the management network. The storage node stores the network performance indicators pushed from the network nodes as a time series of performance measures in database 66 for real-time display and playback. The user node receives the performance measures from the storage node and displays the performance measures graphically in real-time. The user node may use any suitable graphical method in displaying the network performance measures, e.g., in a suitable webpage.

Based on the displayed performance measures, the user may reselect the CC schemes and/or modify CC parameters currently provisioned in the NICs, and instantly evaluate how such the reselection affects the network performance. The user may successively perform multiple reselection iterations to find a combination of CC schemes and CC parameters across the NICs that achieves optimal or close to optimal network performance in accordance with suitable optimization criteria such as utilization, throughput and latency.

Network Node and Smart NIC Structure

Figure 2:
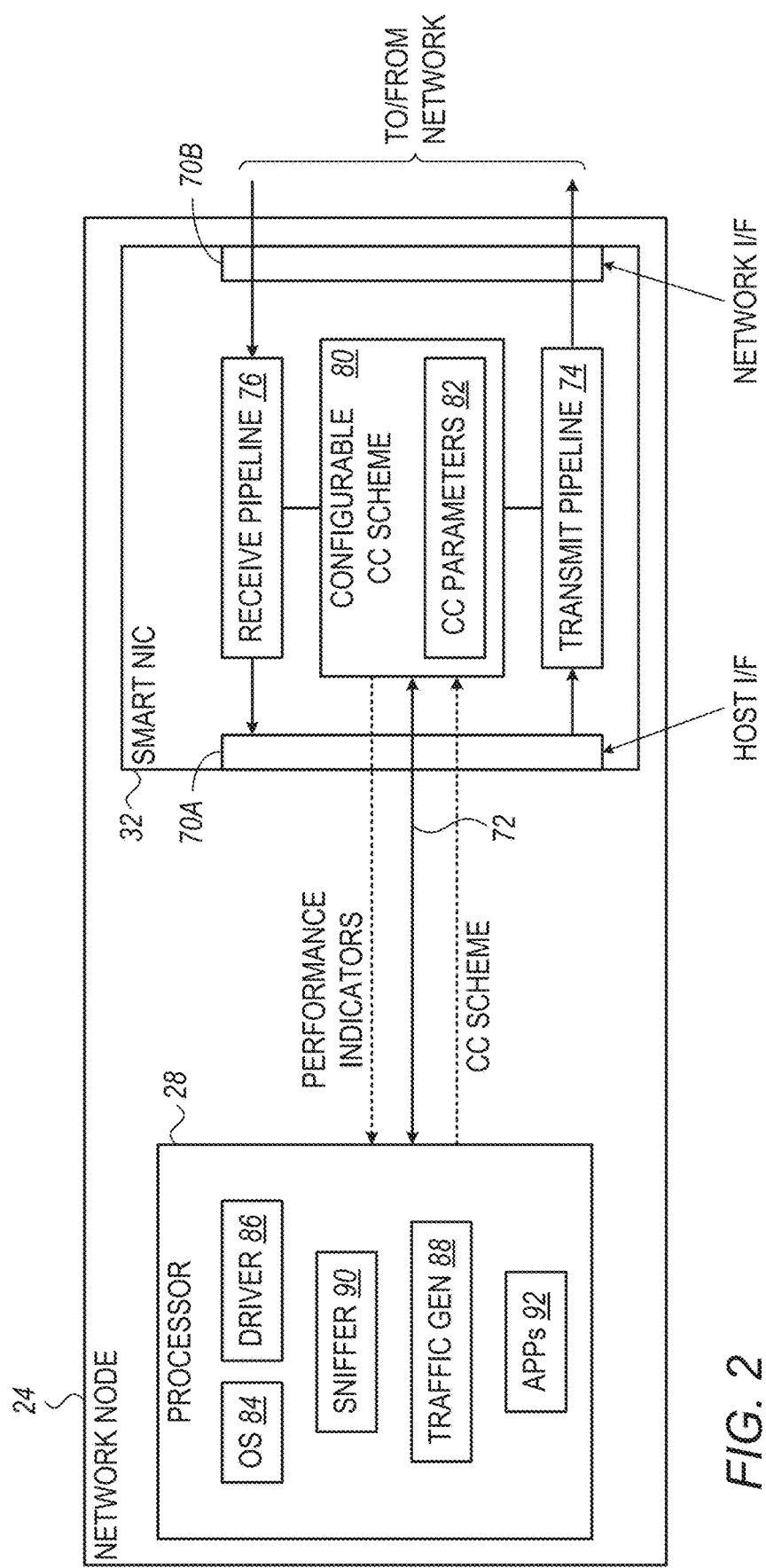
FIG. 2 is a block diagram that schematically illustrates a network node that is applicable in the communication system of FIG. 1, in accordance with an embodiment that is described herein.

FIG. 2 is a block diagram that schematically illustrates a network node (24) that is applicable in the communication system of FIG. 1, in accordance with an embodiment that is described herein.

In describing FIG. 2, it is assumed that network node 24 communicates with a peer network adapter (not shown) over a communication network (e.g., data network 40). In sending packets to the peer network node and receiving congestion notifications from the peer network node, network node 24 of FIG. 2 operates as a Reaction Point (RP). In receiving packets from the peer network node and sending congestion notifications to the peer network node, network node 24 of FIG. 2 operates as a Notification Point (NP).

In FIG. 2, NIC 32 of network node 24 comprises a host interface 70A for connecting to processor 28 using any suitable link or bus 72, e.g., a PCIe bus. NIC 32 further comprises a network interface 70B for connecting to a packet network (e.g., data network 40).

NIC 32 comprises a Transmit (Tx) pipeline 74, a Receive (Rx) pipeline 76, and a configurable CC module 80 (also referred to herein as a configurable CC scheme). Tx pipeline 74 receives data packets from processor 28 via host interface 70A, queues and arbitrates the data packets for transmission, and sends the data packets to the network via network interface 70B. The Tx pipeline may also transmit to the peer network node CC notification packets indicative of CC events detected locally by CC scheme 80.

Rx pipeline 76 receives incoming packets from the network via network interface 70B. The received packets include data packets destined to processor 28, and CC notification packets that that may be used by CC scheme 80 to detect congestion events in the network. In the present context, a CC notification packet may be a dedicated packet that carries no data, or a data packet that carries notification information in addition to data.

The CC notification packets communicated between NIC 32 and a peer NIC (of the peer network node) may comprise, for example, Congestion Notification Packets (CNPs) that the peer NIC generates in response to receiving Explicit Congestion Notification (ECN)-marked packets, Acknowledgement (ACK) and Negative ACK (NACK) packets that are received in response to transmitted packets, Round Trip Time (RTT) measurement packets, and the like. The CC notification packets may also comprise programmable CC packets in accordance with a user-defined CC scheme. In some embodiments, when the peer NIC receives a packet marked with an ECN indication originating from NIC 32, the peer NIC sends a CNP packet back to the sending network node 24.

In some embodiments, processor 28 provisions in NIC 32 a selected CC scheme 80 and/or related CC parameters 82. The CC scheme and its CC parameters (if any) may be selected by an administrator responsively to visualized performance measures, as will be described in detail below. The recently provisioned CC scheme 80 with its CC parameters mitigates congestion in the transmit direction by adjusting the transmission rate based on various inputs such as received notification packets, Rx and/or Tx rates, and the like. Determining the transmission rate may be carried out using any suitable method such as, for example, the "additive-increase/multiplicative-decrease" (AIMD) method, which is sometimes used for congestion avoidance within the Transmission Control Protocol (TCP).

In some embodiments, NIC 32 generates (e.g., using CC scheme 80) performance indicators that are indicative of the performance level of communication network (e.g., data network 40) while the network nodes are communicating with one another over the data network. For example, the performance indicators may be indicative of congestion states occurring in the data network. In an embodiment, the performance indicators are associated with respective times of occurrence.

Processor 28 in network node 24 typically runs several software programs such as an Operating System (OS) 84, a driver program 86 that interfaces between processor 28 and NIC 32, a traffic generator 88, a sniffer 90, and one or more application programs 92.

Processor 28 runs traffic generator 88 to generate a desired traffic pattern during a session of network performance optimization. For example, the traffic generator controls applications 92 to run tasks that generate the desired traffic pattern. The generated traffic may conform, for example, to worst case scenario expected when the network nodes communicate with one another to perform a desired task.

Sniffer 90 receives from CC scheme 80 the actual parameters used by the recently provisioned CC scheme, and further receives, in real time, the performance indicators produced by NIC 32. Depending on the CC parameters being used, the sniffer may obtain some of the performance indicators from OS 84 (rather than from the NIC). For example, query from the OS various counters that count, for example, numbers of pauses and/or CNPs. The sniffer optionally applies pre-processing to the performance indicators and sends the processed performance indicators and CC parameters over management network 50 for storage in storage node 58 for later display.

A User-Controlled Performance Optimization Method

Figure 3:
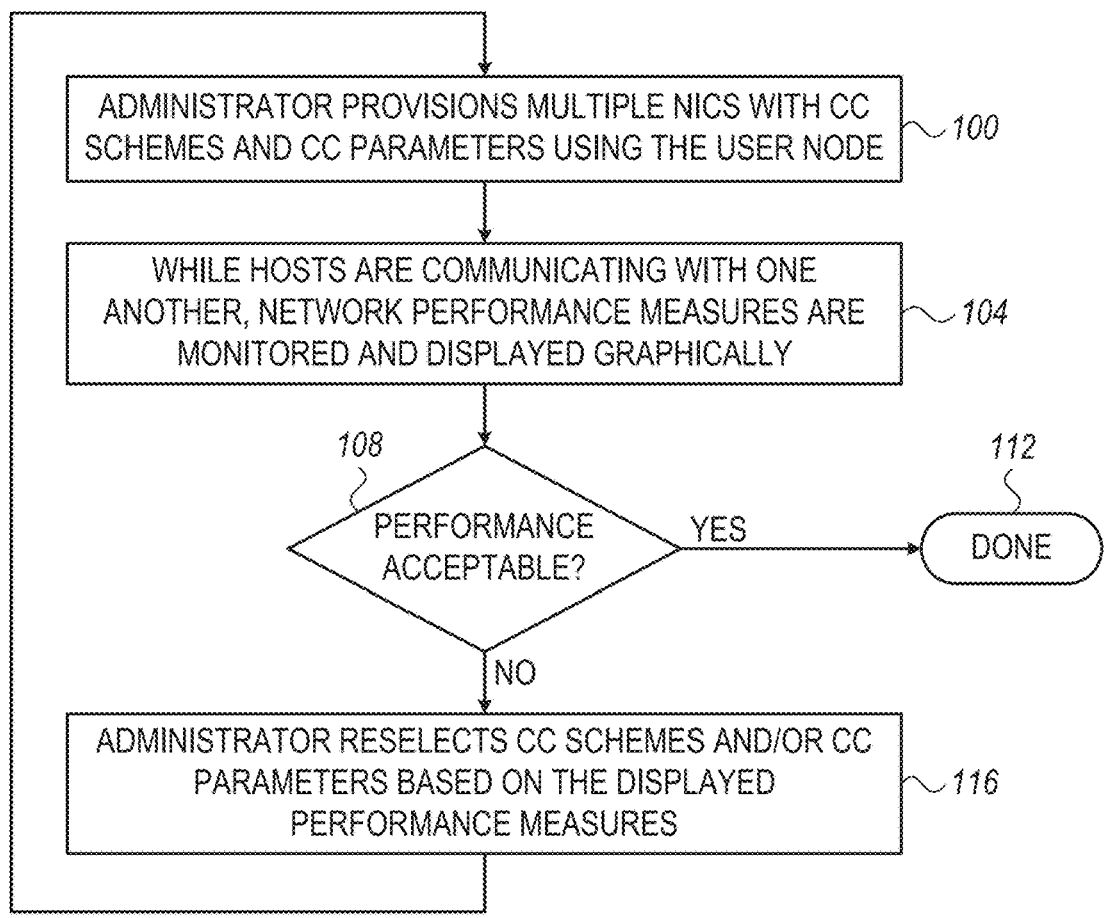
FIG. 3 is a flow chart that schematically illustrates a method for display-driven iterative network performance optimization, in accordance with an embodiment that is descried herein.

FIG. 3 is a flow chart that schematically illustrates a method for display-driven iterative network performance optimization, in accordance with an embodiment that is descried herein.

The method will be described as executed for optimizing the performance of data network 40 of FIG. 1.

The method begins at a provisioning step 100, with a network administrator provisioning multiple NICs 32 in data network 40 with respective CC schemes and related CC parameters using user node 54. The administrator may select initial CC schemes and CC parameters using any suitable method, e.g., depending on the underlying network topology and other factors. For example, the administrator may provision a common default CC scheme and default related CC parameters to at least some of the NICs. Alternatively, the NICs may internally support a default CC scheme and default CC parameters, in which case step 100 may be skipped in the first iteration.

At an optimization iteration step 104, the network nodes communicate with one another while network performance is monitored (as described above) and a resulting time series of performance measures are displayed graphically to the administrator in real time.

At a performance query step 108, the administrator checks, based on the graphically displayed performance measures, whether the network performance is acceptable (e.g., above a specified performance level), and if so, terminates the optimization session at a termination step 112. Otherwise, the method proceeds to a reselection step 116, at which the administrator reselects CC schemes and CC parameters based on the graphical display, to improve the network performance, and loops back to step 100 to provision the reselected CC schemes and CC parameters before performing a subsequent optimization iteration.

Methods for Monitoring, Storing and Displaying Network Performance Measures

Figure 4A:
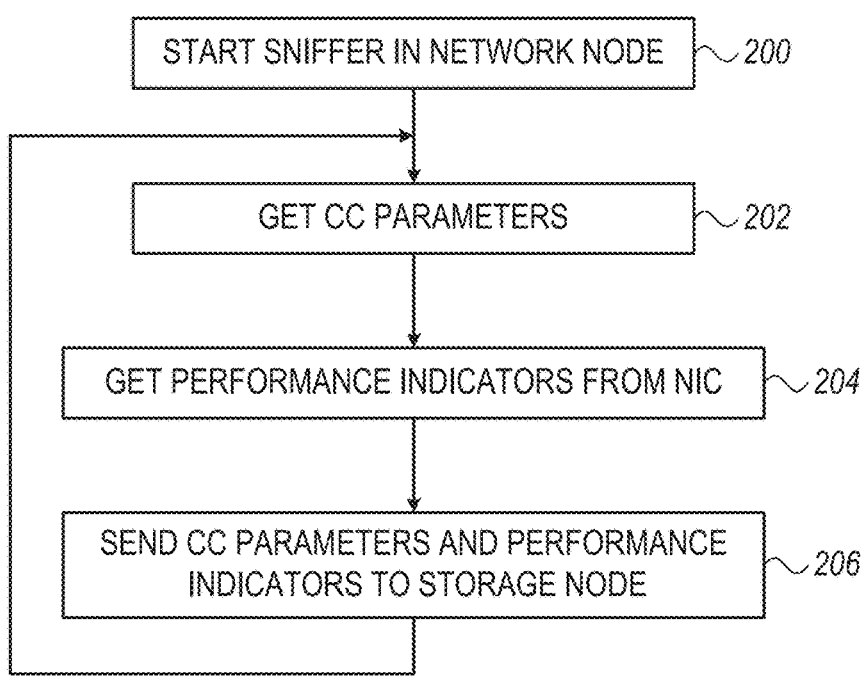
FIGS. 4A-4C are flow charts that schematically illustrate methods for monitoring, storing, and displaying network performance measures, in accordance with embodiments that are described herein.
Figure 4B:
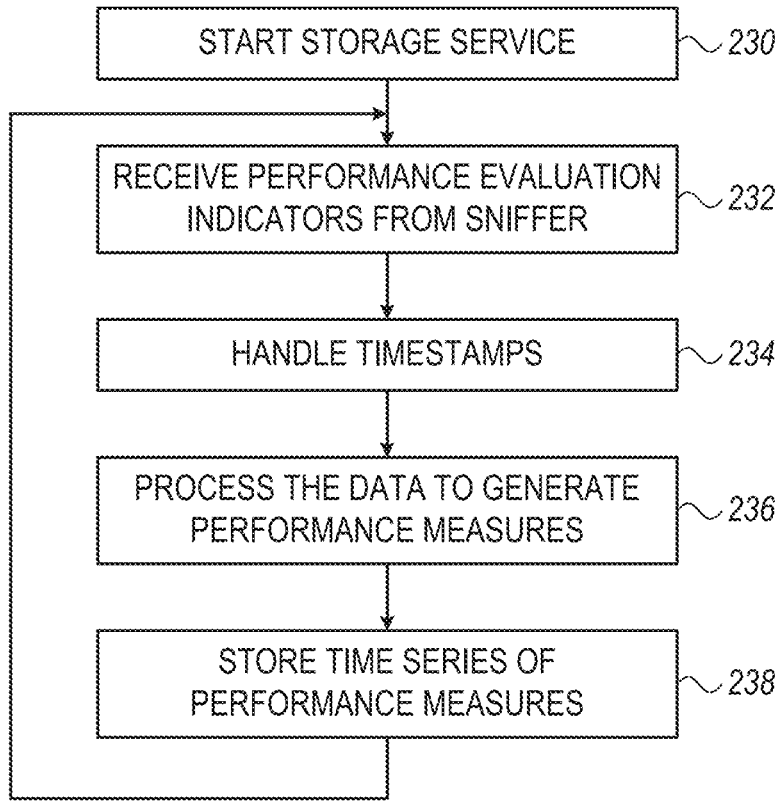
Figure 4C:
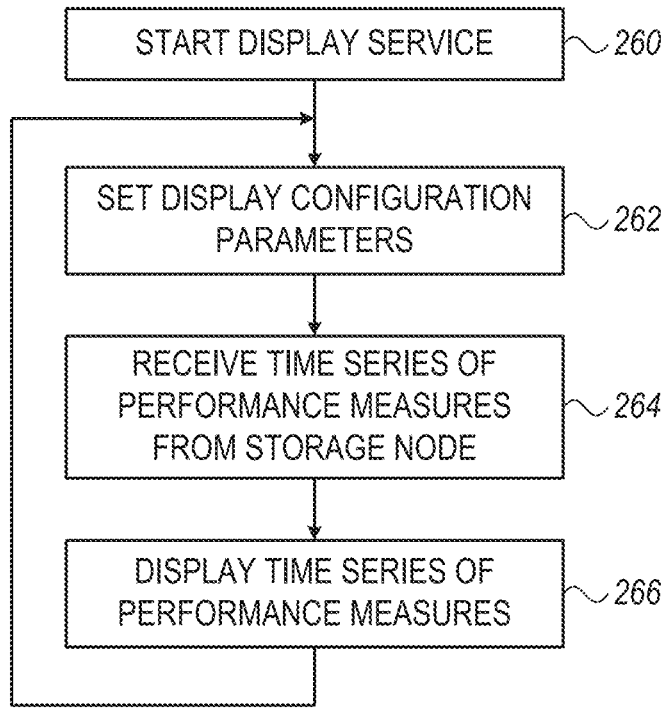

FIGS. 4A-4C are flow charts that schematically illustrate methods for monitoring, storing and displaying network performance measures, in accordance with embodiments that are described herein.

Before the methods start, data network 40 is physically built by interconnecting network elements such as switches and routers in accordance with an underlying topology, and connecting network nodes 24 to the data network. In some embodiments, each network node 24 is installed with an OS 84, a driver program 86, and one or more required application programs 92.

In addition to the data network under test (40), a management network 50 is also built, for managing the network nodes in data network 40 and the optimization process. The management network may be a logical network that fully shares network elements and network nodes with the data network, or it can share the network nodes but use separate switches and routers, thus functioning as a semi-independent physical network. As described above, an administrator provisions CC schemes (80) and corresponding CC parameters (82) in the smart NICs of the data network.

After the data network and management network are built and ready for communication, the network nodes, communicate data with one another to generate background test traffic. The test traffic can also be repeated with different parameters, such as different message length and number of flows, in an embodiment.

Although the methods of FIGS. 4A-4C are described separately, these methods typically are executed in parallel to one another.

The method of FIG. 4A is carried out by sniffer programs 90 running on multiple network nodes equipped with smart NICs 32.

The method of FIG. 4A in each network node begins with processor 28 running sniffer program 90, at a sniffer starting step 200. At a parameter reading step 202 the sniffer receives from NIC 32 the types and values of the CC parameters used by the recently provisioned CC scheme. Depending on the types of the parameters the sniffer may obtain at step 202 some of the CC parameters from OS 84.

At a performance-monitoring step 204, the sniffer program obtains performance evaluation indicators, such as sending rate, receiving rate, RTT, and the like, from NIC 32 and/or from OS 84. The types of performance evaluation indicators received from the NIC, and their sources, may depend on the CC scheme being used by the NIC.

At a sending for storage step 206, the sniffer sends the CC parameters of step 202 and the performance evaluation indicators of step 204, and identification information, to storage node 58 over management network 50. The identification information may comprise, for example, a node's name or IP address, or a local ID (LID) in case of an InfiniBand network. By using the management network, the test results regarding the performance of the data network are minimally affected. The delay introduced by the management network is typically in the order of a few milliseconds, which is sufficient for real-time monitoring.

Embodiments assigning the timestamps can be implemented in various ways. In one approach, the sniffer itself assigns respective timestamps to the performance evaluation indicators, and sends to the storage node the performance evaluation indicators together with the assigned timestamps. In this approach the sniffers are typically time synchronized in the network to get the accurate timestamps and event sequence. In another approach, the timestamp is assigned to a performance evaluation indicator when recorded at the storage side by the database. The time represented by such a timestamp typically differs from the time at which the sniffer captured the performance evaluation indicator, due to transmission delay of the management network. For example, two different sniffer nodes may capture and send for storage two performance evaluation indicators at the same time, but if these indicators reach the storage node (e.g., via the management network) at different respective times, these indicators will be assigned different respective timestamps.

To summarize the tradeoff between the above approaches, the first approach may produce more accurate timestamps than the second approach, but on the other hand, handling and sending the timestamps as in the first approach may impose extra load on the sniffer node and management network traffic, compared to the second approach.

Following step 206, the method of FIG. 4A loops back to step 202 (followed by step 204) to collect subsequent CC parameters and performance evaluation indicators from the NIC. It is possible that during the execution of the method of FIG. 4A, the CC scheme and related CC parameters are replaced for improving the network performance. In some embodiments, the loop in the method of FIG. 4A is executed periodically regardless of whether the CC scheme or CC parameters has been reselected, or not, in at least one of the NICs across the data network. In alternative embodiments, the loop is carried out in response to a modification of a CC scheme or CC parameters in one or more NICs in the data network.

The method of FIG. 4B is carried out by processor 64 of storage node 58, which processes and stores data received from sniffer 90. The storage node may be an independent network node in the management network, or it may coexist with other modules within network node 24. The storage program run by processor 64 may be an independent executable program, or a containerized solution, for example.

The method of FIG. 4B begins with processor 64 executing a storage program, at a storage node starting step 230. At a reception step 232, processor 64 receives performance evaluation indicators from sniffer 90, which the sniffer has collected from multiple network nodes 24 of the data network. At a timestamp handling step 234, processor 64 checks whether the performance evaluation indicators received have corresponding timestamps, and if not, assigns to the performance evaluation indicators respective timestamps based on the times of receiving the performance evaluation indicators.

At a processing step 236, processor 64 produces for at least some of the performance evaluation indicators received from the sniffer a time series of performance measures. Processor 64 may process the performance evaluation indicators, for example, by calculating the differences (e.g., delta) between consecutive samples.

At a storage step 238, processor 64 locally stores the time series of performance measures in time series database 66, for further display and/or playback. Following step 238, the method of FIG. 4B loops back to step 232 to receive subsequent performance evaluation indicators from the sniffer.

The method of FIG. 4C is carried out by user node 54, which processes and displays the CC parameters and network performance measures stored in the storage module. The user node can be an independent network node in the management network, or it can coexist with other modules in a network node. The control and display program run by processor 62 of the user node may be a stand-alone executable program, or a containerized solution.

The method of FIG. 4C begins at a display starting step 260, with processor 62 of user node 54 executing a control and display program. At a display configuration step 262, processor 62 obtains (e.g., from the administrator) display configuration parameters such as, for example, the time period for observing network performance evaluation indicators, the time interval for data refresh, and the node identifier for data collection. Processor 62 configures the user node for displaying in accordance with the display parameters.

At a data reception step 264, processor 62 receives a time series of performance measures from the storage node. In an embodiment, processor 62 may receive the time series in response to sending a query message to the storage node. At a displaying step 266, processor 62 displays the time series of performance measures using any suitable graphics interface, in accordance with the display configuration parameters of step 262. Processor 62 dynamically generates and updates the graphics interface in a graphical method such as webpage.

Following step 266 the method loops back to step 262 to receive updated display configuration parameters. Alternatively, the method may retain the display configuration parameters, and loop back to step 264 to receive subsequent time series of performance measures for display.

Based on the displayed time series of performance measures, the administrator may modify the CC parameters in one or more network nodes 24 and observe, in real time, how the network performance is affected by the modified CC parameters. By repeatedly adjusting the CC parameters and observing the resulting network performance, the administrator can find a set of CC parameters for corresponding NICs across the data network, that achieves the highest network performance. In a similar manner, the iterative optimization process may also include reselection of CC schemes in the NICs and not just the CC parameters.

Example Graphical Representation of Network Performance Measures

Figure 5A:
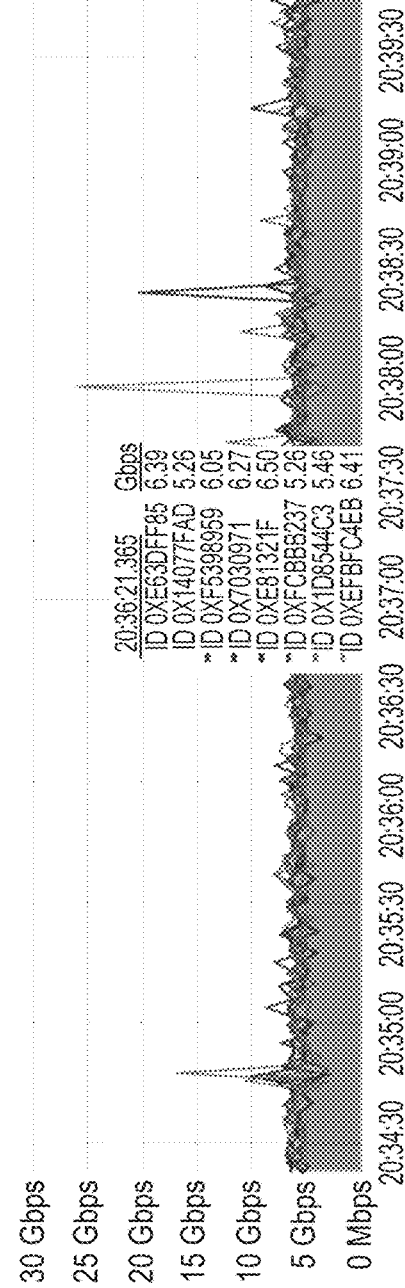
FIGS. 5A and 5B are diagrams that schematically illustrate example visualized network performance measures, in accordance with embodiments that are described herein.
Figure 5B:
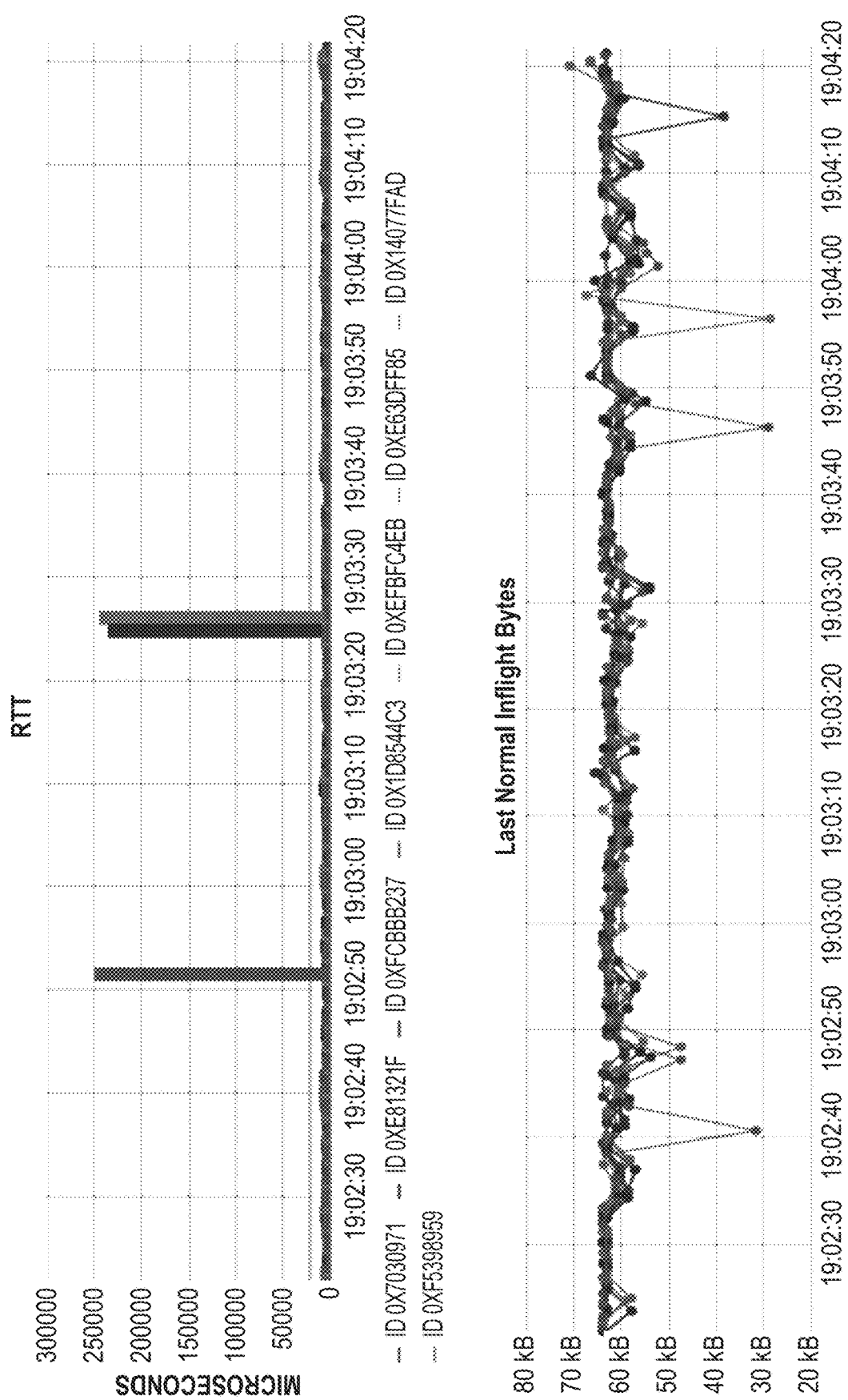

FIGS. 5A and 5B are diagrams that schematically illustrate example visualized network performance measures, in accordance with embodiments that are described herein.

FIGS. 5A and 5B demonstrate example information presentable using a Graphical User Interface (GUI) running on user node 54, showing real-time data collected from network nodes 24 and stored in storage node 58 after modifying configurable CCs.

The communication system configuration of FIG. 1 and the network node and NIC configurations of FIG. 2 are given by way of example, and other suitable communication system, network node and NIC configurations can also be used.

Some elements of NIC 32, such as Tx pipeline 74, Rx pipeline 76 and CC module 80 may be implemented in hardware, e.g., in one or more Application-Specific Integrated Circuits (ASICs) or Field-Programmable Gate Arrays (FPGAs). Additionally or alternatively, some elements of the NIC can be implemented using software, or using a combination of hardware and software elements.

Elements that are not necessary for understanding the principles of the present application, such as various interfaces, addressing circuits, timing and sequencing circuits and debugging circuits, have been omitted from FIGS. 1 and 2 for clarity.

In some embodiments, some of the functions of CC scheme 80, processor 62 of user node 54 and processor 64 of storage node 58 may be carried out by general-purpose processors, which are programmed in software to carry out the functions described herein. The software may be downloaded to the processors in electronic form, over a network, for example, or it may, alternatively or additionally, be provided and/or stored on non-transitory tangible media, such as magnetic, optical, or electronic memory.

The embodiments described above are given by way of example, and other suitable embodiments can also be used. For example, although the embodiments above refer mainly to iterative performance optimization by an administrator, the iterative optimization can be performed automatically by one or more processors. Such automatic optimization may involve Artificial Intelligence (AI) techniques.

As another example, in the embodiments described above it was assumed that NIC 32 supports a single CC scheme at a time. This assumption is, however, not mandatory. In an alternative embodiment, the NIC internally supports multiple CC schemes and reselects one of its local CC schemes instead of being provisioned with the reselected CC scheme. Such an embodiment allows very fast reselection of CC schemes. In the description above and in the claims, the term "provisioning a selected CC scheme in the NIC" (or a similar term with a different phrasing) means (i) downloading to the NIC software or firmware implementing the selected CC scheme, or (ii) choosing the selected CC scheme from among multiple CC schemes available within the NIC.

Although the embodiments described herein mainly address improving performance of lossless networks by tuning CC schemes and related CC parameters, the methods and systems described herein can also be used in other applications, such as in handling Quality of Service (QoS), tuning performance in lossy networks, and network diagnostics.

It will be appreciated that the embodiments described above are cited by way of example, and that the following claims are not limited to what has been particularly shown and described hereinabove. Rather, the scope includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A system for managing congestion in a computer communication network, comprising:
   a plurality of Network Interface Controllers (NICs), to connect multiple hosts to the computer communication network, the NICs supporting a configurable Congestion Control (CC) scheme selected from among multiple CC schemes; and
   one or more processors coupled to the computer communication network, to:
   receive performance indicators generated by the NICs or by the hosts and indicative of congestion states occurring in the computer communication network due to communication of the hosts with one another over the computer communication network, the performance indicators being associated with respective times of occurrence;
   graphically display time-series data indicative of one or more performance measures of the computer communication network over time, the one or more performance measures being based at least in part on the received performance indicators indicative of congestion states;
   receive input indicative of one or more CC schemes to apply to one or more NICs, wherein based on the input different ones of the one or more CC schemes could be applied to different ones of the one or more NICs;
   provision the one or more NICS with the one or more CC schemes based on the received input; and
   receive updated performance indicators generated by the NICs or by the hosts indicative of congestion states occurring in the computer communication network after the provisioning.

2. The system according to claim 1, wherein the one or more processors are to receive the performance indicators while the hosts communicate with one another over the communication network.

3. The system according to claim 1, wherein at least some of the multiple CC schemes are tunable via respective CC parameters, and wherein the one or more processors are to tune the CC parameters in respective CC schemes in at least some of the NICs based on the performance indicators and on the corresponding times of occurrence.

4. The system according to claim 1, wherein the one or more processors are to select a common CC scheme for the one or more of the NICs.

5. The system according to claim 1, wherein the NICs are to receive performance-related notifications from the communication network, and to generate the performance indicators based on the performance-related notifications, or to send the performance-related notifications to respective hosts for generating the performance indicators.

6. The system according to claim 5, wherein the NICs are to send the generated performance indicators over the communication network or over another network for storage in a collection 4 as a time series comprising multiple performance measures together with timestamps respectively assigned to the performance measures.

7. The system according to claim 6, wherein the one or more processors are to retrieve the time series of the performance measures from the collection of data, and to display the performance measures in the time series visually using a graphical display scheme.

8. The system according to claim 7, wherein a user is to perform a performance optimization iteration by selecting the CC schemes and related CC parameters for the one or more of the NICs based on the time series of the performance measures graphically displayed, and controlling the one or more processors to provision the one or more CC schemes and the related CC parameters to the one or more of the NICs.

9. The system according to claim 8, wherein the user is to perform multiple performance optimization iterations of adjusting the CC parameters of the one or more CC schemes in the one or more of the NICs.

10. The system according to claim 1, wherein at least a selected processor among the one or more processors resides in a management host coupled to a management network that connects to the multiple hosts but is separate from the communication network.

11. The system according to claim 1, wherein a given NIC among the plurality of NICs supports multiple CC schemes internally, including a given one of the one or more CC schemes, and wherein the one or more processors are to provision the given CC scheme in the given NIC by indicating to the given NIC to choose the given CC scheme from among the multiple supported CC schemes.

12. A method for managing congestion in a computer communication network, comprising:
   in a system that comprises a plurality of Network Interface Controllers (NICs) that connect multiple hosts to the computer communication network, the NICs supporting a configurable Congestion Control (CC) scheme selected from among multiple Congestion Control schemes, receiving performance indicators generated by the NICs or by the hosts and indicative of congestion states occurring in the computer communication network due to communication of the hosts with one another over the computer communication network, the performance indicators being associated with respective times of occurrence;

graphically displaying time-series data indicative of one or more performance measures of the computer communication network over time, the one or more performance measures being based at least in part on the received performance indicators indicative of congestion states;

receiving input indicative of one or more CC schemes to apply to one or more NICs, wherein based on the input different ones of the one or more CC schemes could be applied to different ones of the one or more NICs;

provisioning the one or more NICS with the one or more CC schemes based on the received input; and receiving updated performance indicators generated by the NICs or by the hosts indicative of congestion states occurring in the computer communication network after the provisioning.

13. The method according to claim 12, wherein receiving the performance indicators comprises receiving the performance indicators while the hosts communicate with one another over the communication network.

14. The method according to claim 12, wherein at least some of the multiple CC schemes are tunable via respective CC parameters, and comprising tuning the CC parameters in respective CC schemes in at least some of the NICs based on the performance indicators and on the corresponding times of occurrence.

15. The method according to claim 12, wherein selecting the CC schemes comprises selecting a common CC scheme for the one or more of the NICs.

16. The method according to claim 12, and comprising receiving by the NICs performance-related notifications from the communication network, and generating the performance indicators based on the performance-related notifications, or sending the performance-related notifications to respective hosts for generating the performance indicators.

17. The method according to claim 16, and comprising sending by the NICS the generated performance indicators over the communication network or over another network for storage in a collection of data, as a time series comprising multiple performance measures together with timestamps respectively assigned to the performance measures.

18. The method according to claim 17, and comprising retrieving the time series of the performance measures from the collection of data, and displaying the performance measures in the time series visually using a graphical display scheme.

19. The method according to claim 18, and comprising performing by a user a performance optimization iteration by selecting the CC schemes and related CC parameters for the one or more of the NICs based on the time series of the performance measures graphically displayed, and provisioning the one or more CC schemes and the related CC parameters to the one or more of the NICs.

20. The method according to claim 19, and comprising performing multiple performance optimization iterations of adjusting the CC parameters of the one or more CC schemes in the one or more of the NICs.

21. The method according to claim 12, wherein a given NIC among the plurality of NICs supports multiple CC schemes internally, including a given one of the one or more CC schemes, and wherein provisioning the given CC scheme in the given NIC comprises indicating to the given NIC to choose the given CC scheme from among the multiple supported CC schemes.

* * * * *